United States Patent [19]

Moll et al.

[11] 3,795,784
[45] Mar. 5, 1974

[54] BALANCING SYSTEM FOR A ROTATING MASS

[75] Inventors: Dean H. Moll, Wayne; Alan Greiner, Cedar Grove, both of N.J.

[73] Assignee: The Singer Company, Little Falls, N.J.

[22] Filed: Aug. 6, 1971

[21] Appl. No.: 169,661

[52] U.S. Cl. .............................. 219/121 L, 73/462
[51] Int. Cl. ............................................. B23h 27/00
[58] Field of Search.... 219/121 EB, 121 L, 68, 121; 73/66, 462

[56] References Cited
UNITED STATES PATENTS

| | | | |
|---|---|---|---|
| 3,404,254 | 10/1968 | Jones | 219/121 LM |
| 3,364,087 | 1/1968 | Solomon et al. | 219/121 LM |
| 3,388,314 | 6/1968 | Gould | 219/121 L |
| 3,259,730 | 7/1966 | Wehde et al. | 219/121 LM |
| 3,293,587 | 12/1966 | Robinson | 219/121 L |
| 3,299,714 | 1/1967 | Thompson et al. | 73/468 |
| 3,121,335 | 2/1964 | Ongaro | 73/462 |

*Primary Examiner*—R. F. Staubly
*Assistant Examiner*—George A. Montanye
*Attorney, Agent, or Firm*—Thomas W. Kennedy

[57] ABSTRACT

Three different types of unbalance are detected and corrected while a gyroscopic inertial flywheel is continuously spinning. The gyroscope is mounted in an integrated test and correction apparatus comprising an angularly positionable mount supported on a shaker table. The mount supports a test chamber in which the spinning gyroscope is located in a low viscosity, low density atmosphere. Windows are formed in the chamber on opposite sides permitting lasers fixed on the mount to be aimed at the flywheel to burn off selected portions of its mass. A safety system is arranged within the chamber to detect whether the spot at which a given laser beam is aimed has already received a laser burn. Mass unbalance is determined, with the spin axis polar, by rotating the gyroscopic reference axes 90° and recording the drift at two orientations. Radial unbalance is determined by imparting a reciprocating motion along the spin axis by means of the shaker table at the same rate as the rotation of the flywheel. By shifting the phase of the vibratory motion relative to the rotation of the flywheel, a maximum signal proportional to the radial unbalance is sensed by one of the gyro pick-offs. Modulation is determined directly by detecting the amplitude of a modulating signal on the pick-off signal. An automated closed-loop procedure determines the correct pattern of laser burns on the flywheel to minimize the unbalances.

14 Claims, 13 Drawing Figures

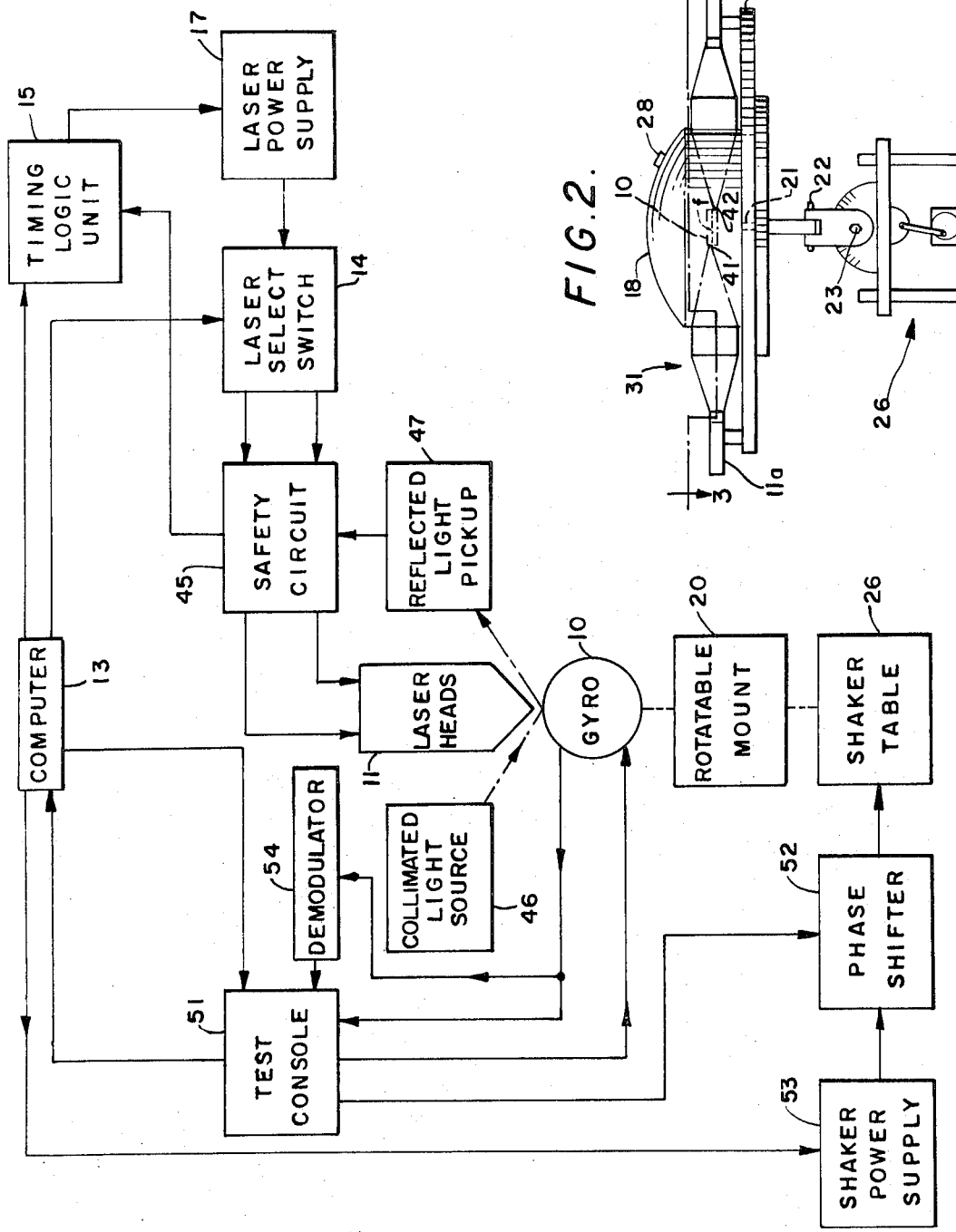

INVENTORS
DEAN H. MOLL &
ALAN GREINER

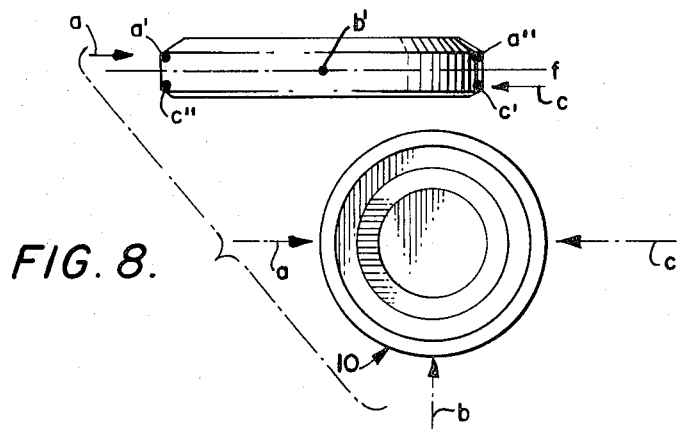
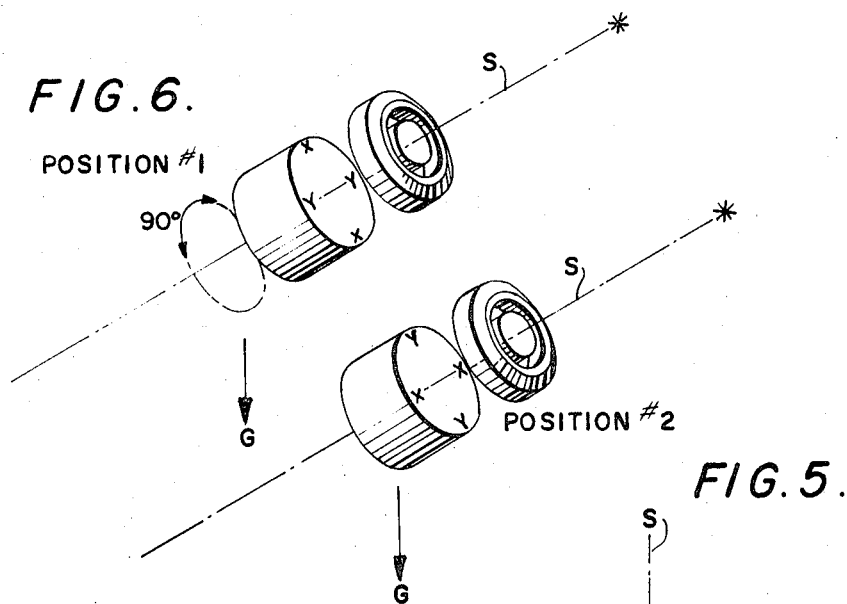
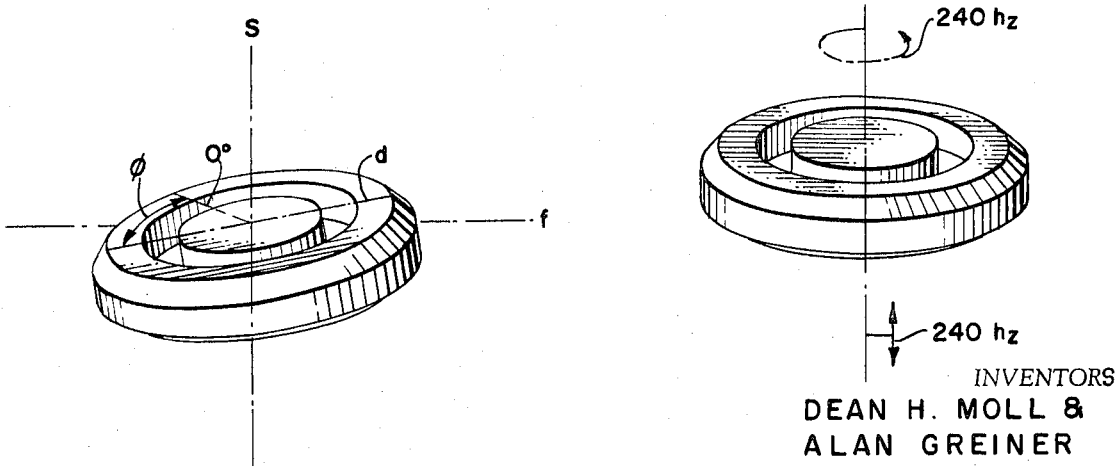

BALANCING SYSTEM FOR A ROTATING MASS

BACKGROUND OF THE INVENTION

The present invention relates generally to the field of gyroscopes and unbalances in rotating machinery and more specifically to improvements in the balancing of free rotor, flexure-suspended gyroscopes, such as those disclosed, for example, in the U.S. Pat. No. 3,077,785 by J.C. Stiles and No. 3,354,726 by W. J. Krupick et al, both assigned to the assignee of this invention.

Because gyroscopes persistently point in one direction unless acted upon by a resultant torque, they are widely used today in inertial guidance systems for aircraft, guided missles, and space vehicles. Due to their simple operation and small size and weight, free rotor flexure-suspended gyroscopes are particularly useful in inertial guidance platforms where accuracy is needed but power, size and weight are at a premium. In this type of gyroscope, and inertial flywheel is mounted at its center of gravity on a flexible hinge which imparts rotation to the flywheel while providing a universal support about which the flywheel can pivot in any direction. Fixed pick-offs arranged beneath the flywheel provide pitch and roll signals indicative of the relative distance of the flywheel from a given pick-off. Because of the small size of the flywheel, the gyroscopic parameters of unbalance are highly sensitive to manufacturing inaccuracies. Generally speaking. unbalances with respect to the central mounting point of the flywheel are undesirable in that they make the flywheel sensitive to accelerations along and perpendicular to the flywheel spin axis. The gyroscope's function is to sense changes in orientation, not linear acceleration. In the past, certain types of unbalance were simpler to detect since spurious vibrations of the flywheel were transmitted through the gyroscope assembly and could induce vibrations in a transducer. However, in the flexure-suspended gyroscope, most of the smaller vibrations are damped out by the flexure hinge; that is, the vibrations fail to be transmitted through the hinge for external measurement.

Gyroscopic unbalances were corrected by removing material or adding material to selected portions of the flywheel. This was usually accomplished by drilling or adding small weights or by a combination of techniques. No matter how the unbalance was corrected, the unbalance detection and correction were always accomplished in completely different stages and with different equipment. The operator always introduced his own errors into a test and correction procedure which was largely trial-and-error and thus extremely time-consuming for fine balance.

SUMMARY OF THE INVENTION

The general purpose of the invention is to provide an automatic, closed-loop system for measuring and correcting unbalances in a continuously spinning, flexure-suspended gyro-flywheel while the gyroscope is supported on a single test stand. Another object of the invention is to minimize the weight and complexity of the unbalance corrective equipment by providing a procedure in which material is removed from the flywheel in a systematic manner to correct three different parameters of unbalance. A further object of the invention is to reduce the time and number of steps involved in determining radial and mass unbalance in a gyroscopic flywheel. Still another object of the invention is to prevent the removal of material from the flywheel at a location where material has already been removed once for unbalance correction.

The applicants have discovered that these and other objects are accomplished by mounting the spinning gyroscope in an integrated test and correction apparatus comprising a shake table supporting an angularly positionable mount on which a test chamber is rigidly supported filled with a low viscosity, low density gas suitable for continuous testing of the gyroscope. A plurality of windows is formed in the test chamber cover permitting powerful lasers, or equivalent beamed energy means, mounted adjacent to the test chamber on the positionable mount to be aimed to burn off selected portions of the gyroscope flywheel. The lasers are aimed respectively at points above and below the flexure axis 180° opposed to each other. In another embodiment a third laser situated between the first two is aimed at a neutral point on the flexure plane. Based on unbalance measurements, one or more of the lasers are fired briefly at the circumference of the flywheel at a predetermined time in relation to the rotation of the flywheel. A small portion of the metallic flywheel is instantly melted and vaporized in a burst called a "plume". To insure that metal in the plume does not fall back onto the flywheel and contaminate it, pressurized gas is aimed at the location of the burn to blow the exploded metal in the direction of a styrofoam wall which traps the molten metal.

A safety system is provided to prevent two successive burns in the same location. Stacking of two or more burns could drill through the thin outer rim, exposing the sensitive interior of the gyroscope of another possible burn through the hole. The safety system comprises a collimated beam of light aimed at the burn location. A photo-diode is arranged to pick up light reflected from the surface of the flywheel. If a burn has already been executed at a selected location, the light reflected at that time will be interrupted since the small beam will be trapped or partially deflected by internal reflections within the pre-existing burn crator.

The shaker table provides a new means of determining radial unbalance. Since the lasers are fixed on the positionable mount, motion of the shaker table does not change the relative position of the laser heads and the gyroscope. Thus, the shaker table can be running while laser burns are made. If the shaker is run at the same frequency as the rotation of the flywheel, a heavy spot about the spin axis causing radial unbalance will appear to be in the same location during each stroke of the strobe-like shaker table. Since this spot will have more linear momentum imparted to it from the shaker table, it will exhibit a longer up-down swing than other locations on the flywheel. By changing the phase of the shaker frequency, the heavy spot can in effect be shifted to be stationed directly over a selected gyroscopic pick-off whose drift signal will exhibit a maximum at that time. In accordance with the timing of the shaker table in relation to the flywheel rotation, the appropriate laser head can be fired to remove material at the proper location along the circumference of the flywheel.

Mass unbalance along the spin axis is detected or orienting the spin axis in the neutral polar direction, detecting the drift signals for roll and pitch with the orthogonal reference axes of the gyroscope in a first position and then detecting the same parameters in a second position wherein the reference axes are rotated about the spin axis 90° from the first position. The resulting values of drift for roll and pitch at the two positions can be used to derive mass unbalance. The third unbalance parameter, modulation, is detected directly by demodulating one of the pick-off signals.

A step-by-step procedure is disclosed employing, in one embodiment, four different burn patterns to accomplish correction of the three unbalance parameters with a minimum number of laser burns. The procedure is closed-loop in that the laser corrections continue to be made until the tested unbalance parameters are nulled to a predetermined tolerance. An initial routing system determines which type of burn pattern should be executed first, depending on the relative presence or absence of certain unbalance parameters.

BRIEF DESCRIPTION OF THE DRAWINGS

FIG. 1 is a block diagram illustrating the arrangement of unbalance detection equipment and laser correction apparatus according to the invention.

FIG. 2 is a schematic representation of the testing and correction apparatus of FIG. 1.

FIG. 5 is a schematic representation illustrating a preferred method of determining radial unbalance.

FIG. 6 is a schematic representation illustrating a preferred method of determining mass unbalance.

FIG. 7 is a schematic representation illustrating the angle of the modulation plane with respect to a fixed point on the gyroscopic flywheel.

FIG. 8 illustrates one type of burn pattern requiring three laser heads instead of two.

DESCRIPTION OF THE PREFERRED EMBODIMENTS

Figure 3:
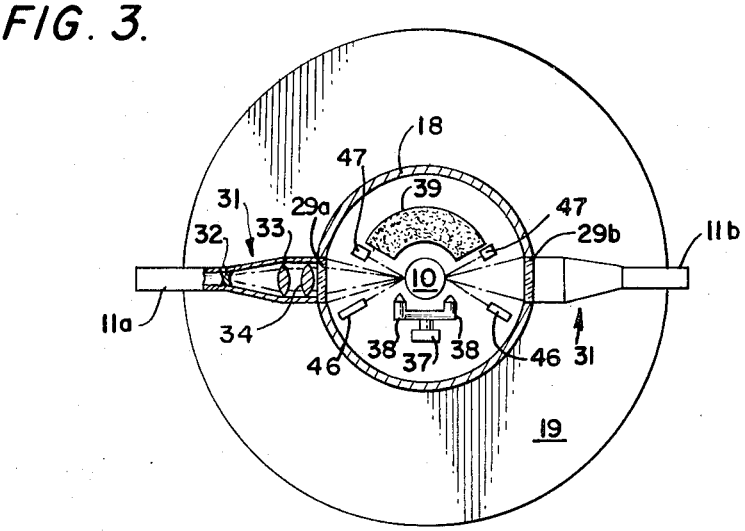
FIG. 3 is a cross-sectional view taken along the line 3—3 in FIG. 2 illustrating the internal components of the apparatus.

Referring to the drawings, FIGS. 1, 2 and 3 show the arrangement of the test and correction apparatus. A flexure-suspended gyroscope 10 is mounted so that its spinning flywheel is accessible to focused beams of high energy coherent light produced by laser heads 11. Laser heads 11 may be any one of another commercially available lasers of sufficient power to burn the metal. Based on measurements of gyroscopic unbalances, computer 13 determines the appropriate laser head or combination of heads to fire at the flywheel and sets laser-select switch 14 accordingly. Laser select switch 14 can be any high voltage switch capable of switching the laser power. During each revolution of the flywheel, the time at which a particular fixed head is fired determines and angular position of the burn about the circumference of the flywheel. Computer 13 determines this angular position based on the unbalance measurements, and timing logic unit 15 enables laser power supply 17 at the proper instant of time corresponding to the determined angular position.

Computer 13 can be any computer well known in the art, which can be programmed in the manner described below in connection with FIGS. 10 to 13. The laser power supply 17 would be any suitable supply well known in the art for use with the laser heads 11. Further, the timing logic unit 15 may comprise any combination of well-known logic components, arranged in a manner well-known in the art to be suitable for providing the required functions described below.

As shown in more detail in FIGS. 2 and 3, laser heads 11 preferably comprise a pair of lasers 11a and 11b 180° opposed to each other aimed at opposite sides of gyroscope 10. Gyroscope 10 is mounted in a sealed chamber formed by cover 18 secured to the top platform 19 of an angularly positionable mount 20 providing measured rotation about three orthogonal axes 21, 22 and 23. The spin axis of gyroscope 10 generally coincides with axis 21 so that the spin axis can be oriented in any desired direction. Mount 20, in turn, is securely mounted on a shaker table 26 comprising a suitable arrangement of vertical guides and eccentric motor means to impart a completely vertical reciprocating motion of known frequency to mount 20 and its supported gyroscope 10.

During testing the test chamber is filled via port 28 in cover 18 with a low density, low viscosity gas such as helium. Dense gas mixtures like air are undesirable since they introduce drag and other effects due to turbelence which tend to damp or mask gyroscopic motions due to unbalances. Referring to FIG. 3, laser windows 29a and 29b are formed on opposite sides of cover 18. The beam of collimated coherent light from laser 11a passes through window 29a via an optical system 31 to strike the flywheel surface of gyroscope 10 in a focused point. Optical system 31 comprises a diverging double concave lens 32 followed by a double convex re-collimating lens 33 which in turn is followed by a double convex focusing lens 34 to provide a point of intense radiant energy at the surface of gyroscope 10. Laser 11b has a similar optical system.

Inside cover 18 a pump unit 37 supplies a pressurized stream of gas via a pair of tubes 38 at the location of laser burns. The stream is aimed so that material removed from the flywheel by a laser burn is blown away from the gyroscope to a collector material 39. A preferred material for collector 39 is styrofoam since it presents an irregular surface which melts on contact with the vaporized or molten metal, trapping the metal and thereby preventing contamination of the gyroscope. The styrofoam may easily be shaped into a curved wall to form a pocket for metal collection.

It should be noted in FIG. 2 that while points 41 and 42 at which lasers 11a and 11b are aimed are 180° opposed to each other, they lie above and below axis $f$ (FIG. 2) at equal distances therefrom. Axis 43 represents the flexure plane, perpendicular to the paper in FIG. 2, including the desired center of gravity and oriented perpendicularly to the spin axis of gyroscope 10.

Referring to FIGS. 1 and 3, a safety system is provided including a safety circuit 45 which disconnects laser heads 11 from their source of power in the event that logic unit 15 has selected a point on the circumference of the flywheel which has already received one burn. Safety circuit 45 may comprise switches similar to those described above for use as laser select switch 14 which are responsive to an output from the reflected light pickup 47 to be described below rather than to an output from computer 13. As will be seen, a typical flywheel has a thin outer ring through which a number of successive burns in one location might easily burn, exposing the interior of the gyroscope. Thus, to detect the existence of a previous burn crater, a collimated light source 46, which may comprise a small aiming laser, is directed at the burn point 41 or 42 (FIG. 2). A reflected light pick-up 47, which may comprise a photodiode or other photo-sensitive element, is located at the appropriate angle to receive light from source 46 reflected from the outer circumference of the flywheel of gyroscope 10. Only smooth or virgin metal will reflect well; if a burn crater exists, the thin beam of light will become trapped or deflected by multiple internal reflections within the crater so that pick-up 47 will not receive a sufficient level of reflected light. Pick up 47 is adapted, in a manner well-known in the art, to produce at such times, a signal for sending safety circuit 45. Safety circuit 45 is adapted, in a manner well-known in the art to open the connection between laser 11a and 11b and laser power supply 17. If circuit 45 is activated by the existence of a burn crater, a signal is sent to logic unit 15 moving the burn position by an increment typically +1° away from the selected spot to a nearly equivalent location.

A test console 51 (FIG. 1) provides an interface with the operator for starting and stopping various test operations an provides unbalance information to computer 13 which determines the appropriate number and location of laser burns to correct the unbalances. Test console 51 will contain certain input and output devices well-known in the art for recording the output data from the system and for providing inputs to the computer 13 as will be described below. From the nature of the required inputs and outputs of the system, the selection of the particular devices to be used in the test console 51 is well within the ability of those skilled in the art. Mass unbalance detection is accomplished by test console 51 by means of positionable mount 20 as will be discussed hereafter. The frequency of reciprocating motion induced by shaker table 26 is regulated by shaker power supply 53 activated by computer 13. The output of supply 53 is passed via a phase shifter 52 to shaker table 26. Phase shifter 52 changes the phase difference between the shaker table vibration and the rotation of the gyroscope to assist in determining radial unbalance. The modulation parameter is detected by demodulator 54 which detects the amplitude of modulation of a pick-off signal in the absence of vibration from the shaker table 26. A shaker table 26 and shaker power supply 53 suitable for the application may be selected from many which are commercially available and well-known to those skilled in the art. Phase shifter 52 may be any one of a number of devices well-known in the art for shifting the phase of an alternating current.

Figure 4:
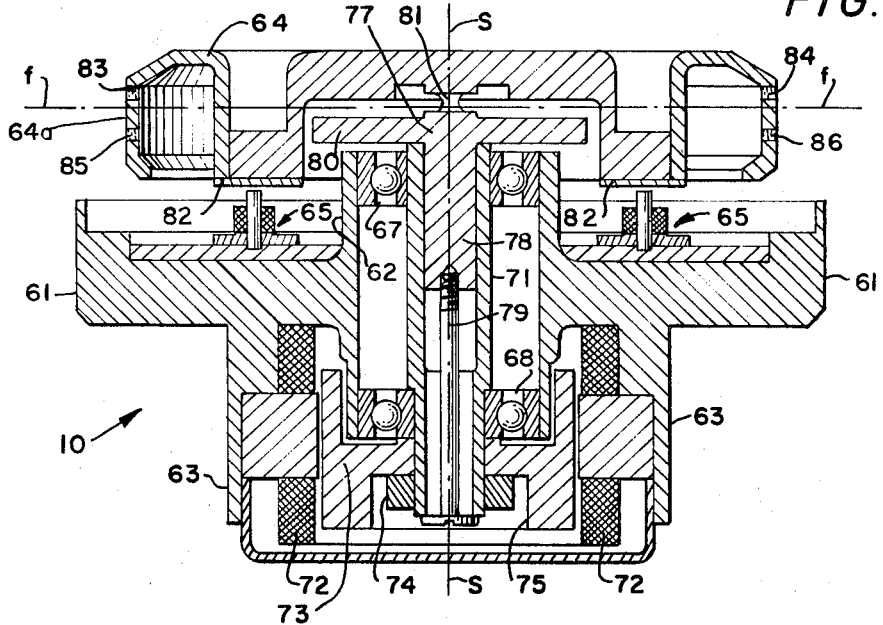
FIG. 4 is a cross-sectional view illustrating a typical embodiment of a flexure-suspended gyroscope of the type for which unbalances are corrected by the system of FIG. 1.

Referring now to FIG. 4 the pertinent details of a typical embodiment of flexure-suspended gyroscope 10 will be described to facilitate an understanding of the types of unbalances detected and corrected by the system of FIGS. 1, 2 and 3. Gyroscope 10 is generally similar to the gyroscopes fully disclosed in the aforementioned Krupick et al. and Stiles patents, and therefore only those parts which are necessary for a full understanding of the present invention are illustrated. Gyroscope 10 includes an integral main frame having an annular flange 61, a hollow cylindrical bushing 62, and a downwardly-extending cylindrical skirt 63. An upper end enclosure cap (not shown) can be mated to the flange 61 along its peripheral edge to form an enlarged upper cavity within which the gyroscope's inertial flywheel 64 and pick-offs 65 are located. The flange, bushing, and skirt are co-axially related to one another with respect to a spin or reference axis s passing vertically through the gyroscope in the plane of the paper. Supported within bushing 62, at either extremity thereof, are respective ball bearing units 67 and 68 for axially and radially supporting a hollowed-out drive shaft 71 for rotation about spin axis s. Located at the lower end of cylindrical skirt 18 is a conventional electric motor for rotating shaft 71. The motor has its stator windings 72 secured to the interior surface of skirt 63 and includes an armature assembly in the form of a generally cylindrical hub member 73 co-axially positioned on drive shaft 71. Hub member 73 is press-fit over the drive shaft and secured in an abutting relation against the inner race of lower ball bearing unit 68 by a hex nut 74 or similar fastener, threadedly secured to the lower end of shaft 71 within a counterbored recess 75 in the lower surface on the hub member. In operation, energization of the stator windings 72 causes the hub member 73 and the shaft 71 to spin about axis s.

Inertial flywheel 64 is mounted for rotation on a supporting gimbal unit 77 having an annular flange portion 80 and a cylindrical, downwardly extending portion 78 received in the hollow central portion of shaft 71 and secured thereto by means of screw 79. The inner connection between flywheel or rotor 64 and gimbal unit 77 comprises a flexure hinge 81 formed from a unitary solid cylinder of resilient spring metal having a symmetrically-machined or otherwise necked-down portion intermediate to the rotor and gimbal unit. Thus, while rotation is imparted to flywheel 64 by shaft 71 through flexure hinge 81, flywheel 64 is free to pivot in relation to flexure hinge axis $f$ (lying in the flexure plane) under applied torque.

An annular track 82 formed on the underside of flywheel 64 serves as a return path for pick-off 65. Each pick-off comprises primary and secondary windings operatively disposed on a U-shaped core. The poles of the core are mounted adjacent to the annular track 82 so that the flux is increased and decreased by the air gap between the core and the return path track. Thus, if the primary coil is excited with a frequency signal, the amplitude of the signal on the secondary coil will vary according to the distance of the track from the particular pick-off. Four pick-offs are actually used, located 90° apart from each other. Two opposite pick-offs comprise a pair whose signals may be compared to provide an indication of roll or pitch of the flywheel. In operation the pick-off signals are used as error signals to drive conventional "torquer" motors (not shown) which change the orientation of the gyroscope frame to "re-center" the flywheel on the flexure plane. The current supplied the torquers is a measure of drift or change in orientation with respect to two orthogonal reference axes.

Four darkened spots 83, 84, 85 and 86 will be noted on the rim 64a of the flywheel. The spots can be used to illustrate the types of unbalance identified and removed by the invention. If any one of these spots is assumed to be a single heavy point, it is evident that an ordinary radial unbalance, designated RUB, will result. This is the type unbalance that is normally identified in rotating machinery by conventional transducer pickups at the mounts. It is also normally removed by conventional methods such as drilling, grinding, filling or adding of weights. It is the typical kind of unbalance cured by conventional balancing of automobile tires. The presence of RUB means that for some plane taken parallel to axis $f$ and including the axis, there is more mass on one side of axis s than on the other side. Now, if the darkened spots are considered to be heavy spots in pairs, unbalances relative to flexure 81 will result. Consider the pairs 83 and 84, or 85 and 86. No vibration is produced by either pair since the torque about hinge 81 attributable to any one heavy spot is balanced by the other. However, the existence of one of these pairs does mean that there is more mass above than below the flexure plane $f$ (the plane perpendicular to the paper including axis $f$). Thus, flywheel 64 would be sensitive to accelerations in the direction of axis $f$. The type of unbalance contributed by a pair such as 83 and 84 is termed mass unbalance along the spin axis (MUB), and could not formerly be efficiently identified and removed by ordinary means.

Flywheel 64 is subject to still another type of unbalance. Consider a pair of spots oriented diagonally with respect to axis $f$ to be heavy spots, for example 84 and 85. If the amount of each individual heavy spot forming a diagonal pair is equal relative to the flexure hinge 81, neither RUB nor MUB results. With the flywheel at rest, no spurious tilt would exist and the flywheel would not be sensitive to linear accelerations, unlike RUB and MUB. However, if the flywheel is continuously rotating, spots 84 and 85 will each be subject to a centrifigal or radially-outward force. The direction of the force will be parallel but not concident with flexure plane $f$. The forces acting on spots 84 and 85 do not cancel because both cause a clockwise torque on the flywheel. The result will be that the flywheel will assume an equilibrium angle of plane relative to flexure plane $f$ during rotation. The flywheel will always keep the same tilt and in fact the same portion of the flywheel will be tipped down at all times. In the illustrated case, the angular portion of the rim coinciding with spot 84 will at all times be the lowest spot on the flywheel. This type of unbalance will cause a spurious modulation of the pick-off signal since the gap between the annular track and a single pick-off will vary sinusoidally for each rotation of the wheel.

The manner in which RUB is identified and measured requires that shaker table 26 (FIG. 1) be reciprocating mount 20 carrying gyroscope 10 at the same rate at which the flywheel is spinning. For this test, the spin axis of the flywheel is actually aimed at the north star, Polaris, so that its spin axis is "polar" or parallel to the earth's axis of rotation, thus eliminating the undesirable effect of the earth's own rotation on the gyroscope. Referring now to FIG. 5 the motion required for RUB measurement is schematically depicted. If the flywheel wheel is rotating about its spin axis at 240 Hertz or 14,400 r.p.m., the shaker must provide a linear acceleration component along the spin axis s at the same rate, 240 Hertz. A typical shaker stroke at 240 Hertz would provide an acceleration of 2 G's peak-to-peak. All points of mass on the flywheel are imparted momentum along axis s by the shaker motion. With the wheel radially balanced, any mass located near the rim, for example, will have its momentum offset by another mass concentration on the other side of axis s. However, if the wheel is not radially balanced, there will exist some point whose momentum is not balanced on the other side. This point, because of its "resultant" momentum, will resist reversals of linear motion more than other points along the circumference of the flywheel. Therefore, with each stroke of the shaker table, that angular position on the flywheel will tend to swing farther than other positions. Since the shaker table is synchronous with the flywheel, the heavy spot will occur at the same place during each stroke of the table, in a strobe-like manner. Now, if the phase relationship of the shaker table and the flywheel rotation is changed, the location of the heavy spot on each stroke can in effect be moved to a desired location. To measure the magnitude of RUB, the heavy spot is shifted by changing the phase of the shaker table frequency by means of phase shifter 52 (FIG. 1) so that it is directly over one of the pick-ups, for instance, for roll. This position is determined by noting the point, as the phase is shifted, at which the $D_x$ is maximized. $D_x$ represents drift in the direction of roll and corresponds to the "restoring" current supplied to the torquer motor to drive the pair of pick-offs to null to compensate for relative motion between the flywheel and pick-off fixture (gyroscope frame). In this case, RUB is computed by the equation:

$$\text{RUB} = |D_{x2} - D_{x1}|/2 \cos \theta, \qquad (1)$$

where $D_{x1}$ is the drift rate with no input from the shaker table, $D_{x2}$ is the drift rate after the shaker table has been turned on and slewed to maximize $D_x$, and $\theta$ is the angle that the polar axis makes with the local horizontal.

The manner in which MUB is determined and measured is illustrated in FIG. 6 where the spin axis is again polar. Recall that MUB is an unbalance along, not about, the spin axis which causes an unacceptable sensitivity to accelerations which have a component perpendicular to the spin axis. At first glance it would appear that MUB could be measured simply by stopping the flywheel, holding it with the spin axis horizontal so that gravity could act on it perpendicularly, and noting the tilt angle of the wheel at rest. In operation, however, the flywheel will be continuously spinning and other gyroscopic parameters come into play to make the latter type of measurement inaccurate. Instead, a two position measurement, involving 90° rotation of the reference co-ordinates about the spin axis, has been devised. With the $x$, or roll axis, pointing as close to "up" as possible, $D_x$ and $D_y$, the roll and pitch restoring currents for compensating drift, are measured and recorded in position one. Next, the reference co-ordinate plane is rotated 90° about the spin axis so that now the $y$ or pitch axis is pointing up. Again $D_x$ and $D_y$ are recorded. The following set of four equations permits the solution of the four variables MUB, $R_x$ and $R_y$, which represent the constant gyroscopic restraint terms along the $x$ and $y$ axes, and $D_q$ which represents the "quadrature G term," indicative of drift on the X axis produced by acceleration along the y axis (and vice versa):

$$D_{x1} = -\cos\theta \; MUB + R_y$$
$$D_{y1} = R_x - \cos\theta \; D_q$$
$$D_{x2} = R_y - \cos\theta \; D_q$$
$$D_{y2} = R_x + \cos\theta \; MUB,$$

where the subscripts 1 and 2 indicate the positions (FIG. 6) at which the parameter was recorded. It follows that:

$$MUB = (D_{y2} - D_{y1} - D_{x1} + D_{x2})/2 \cos\theta. \quad (2)$$

The equation can be solved for $R_x$, $R_y$ and $D_q$ in a similar manner. A detailed explanation of the origins of the quadrature G and restraint terms is omitted since these terms are familiar to those working in the gyroscopic arts. It should be noted also that the sign of the MUB is also provided by the above equation and indicates whether the heavier side of the flywheel is above or below the flexure plane.

The modulation unbalance, MOD, can be identified and measured more directly. The primary windings of a single pick-off may be excited with a known frequency acting as a carrier wave. The output of a secondary winding (without the shaker table running) will be modulated sinusoidally at precisely the frequency of rotation of the wheel due to the effect of modulation. This modulation is detected by demodulator 54 (FIG. 1) in the manner of AM radio detection to ascertain the modulation amplitude.

To correct RUB, MUB, and MOD, one must know not only the amount of material to remove from the rim of the flywheel, but also the angular position about the spin axis and whether the laser burn is to be located above or below the flexure plane. In the case of MUB, the angular position about the spin axis is of no concern. It is sufficient merely to calculate the amount of material to be removed, that is, the amount of material removed by one laser burn times the number of burns to be employed, and whether the burns are to be located above or below the flexure plane. The opposite is true for RUB: While the number of burns must still be calculated, the location above or below the flexure plane is of no consequence. Instead, the angular position about the spin axis is all-important. However, this angular position has already been determined by the phase difference between the shaker table and the spinning flywheel for which the $D_x$ was maximized. Hence, this time-difference can be entered into timing logic 15 to fire the laser at a time which would coincide with the adjusted shaker table 26 stroke.

To correct for modulation, one must also know the amount of material to remove and the angular position at which the laser must be fired. This angle is more difficult to determine, but can be measured in a manner analogous to that of the RUB angle. Referring to FIG. 7, the angle $\phi$ represents the angular difference between some fixed point on the flywheel 0°, and the particular flywheel diameter line which is always oriented at the steepest angle to the flexure plane. This diameter line will, of course, lie in the same plane as the two diagonal heavy spots, causing the modulation. A strobe light can be used for this measurement. An appropriate window can be formed in test cover 18 (FIG. 2) to view the strobe-illuminated flywheel. The strobe light should be operated at the same frequency as the rapidly spinning flywheel. The phase is first indexed to coincide with the occurrence of 0° at a known position with respect to some fixed object. If one is looking directly at the flywheel in a direction perpendicular to the spin axis, the aspect of the flywheel illuminated on each flash of light will change as the strobing phase is changed. When the top of the spinning wheel has the broadest or widest aspect, (largest ellipse) one will be looking in a line of sight lying in the same plane as the desired diameter line d in FIG. 7. Alternately, when the aspect of the top of the spinning flywheel is the least (a straight line), line $d$ will be rotated 90° with respect to the viewer. In either case, the angle $\phi$ can be identified by knowing the new phase of the strobe. This then is the angle which is entered into timing unit 15 to control the angle position (timing) of the burns to correct for modulation.

The discussion will now turn to the pattern of burns used to correct the unbalances. Referring to FIG. 8 one approach is to orient three separate lasers, $a$, $b$ and $c$, about the circumference of gyroscope 10. The arrangement is shown schematically here, but would be similar to that of FIG. 2 except that there would be one more laser. Laser a would be aimed to burn the rim of the flywheel at point a above the flexure plane. Laser b would be aimed at point $b'$ lying on the flexure plane. And, laser c would be aimed at point $c'$ lying below the flexure plane. With this configuration, the individual parameters of unbalance can be corrected without affecting the other parameters. In particular, a burn at spot $b'$, while neutral with respect to MOD and MUB because of its location on the flexure plane, would be suitable for correcting a radial unbalance at a particular angular position. With lasers $a$ and $c$ located on opposite sides and fired simultaneously at point $a'$ and $c'$, modulation unbalance can be corrected without affecting either of the other parameters. To correct MUB only, the appropriate laser $a$ or $c$ would be fired twice at a time interval corresponding to rotation of the flywheel through 180° so that two burns, $a'$ and $a''$, or $c'$ and $c''$, would be made at opposite sides of the flywheel. Since the torques about the spin axis cancel, as well as the centrifugal forces, the MUB-only burn has no effect on MOD or RUB.

It has been found that laser $b$ can be omitted with only a small sacrifice in the number of additional burns which must be made. The compelling advantage of eliminating laser $b$ and using only lasers at positions $a$ and $c$ (FIG. 8) is weight reduction. Referring again to FIG. 2 the heaviest components mounted on positionable mount 20 are the lasers which must be rigidly mounted on the test stand.

Figure 9:
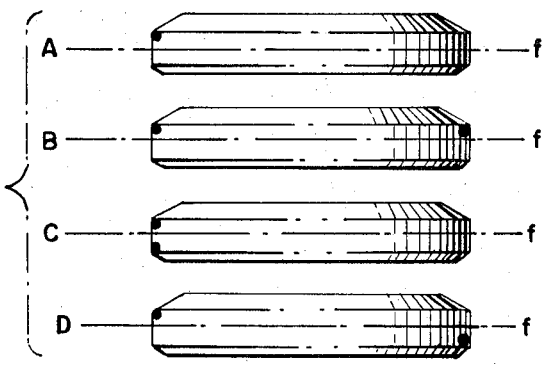
FIG. 9 is a schematic representation of the preferred four burn patterns produced by the apparatus of FIG. 2.

Referring now to FIG. 9, preferred burn patterns are referred to as A, B, C and D. It will be noted that burn patterns B and D are essentially the same as those for the arrangement of FIG. 8. Burn pattern B illustrates the location of corrective burns for MUB-only, located on one side of the flexure plane. The two burns would be below the plane if MUB were of opposite sign. Burn pattern D is to correct MOD only. Burn pattern C represents a RUB-only correction. Since the two burns are equidistant from the flexure plane and located at the same angular position about the spin axis, MOD and MUB are not affected. Burn pattern C is therefore equivalent to burn $b'$ in FIG. 8. Burn pattern A is a complex burn. Since it is a single burn above the flexure plane, MUB is affected. RUB is also affected because the burn is not radially cancelled, and MOD is increased or decreased since there is a resultant centrifugal force.

Based on unbalance measurements for a given flywheel, an appropriate sequence of burn patterns A through D can be chosen to minimize the number of burns required to produce a balanced wheel. For example, if a flywheel direct from the manufacturer were tested and found to have radial and modulation unbalances within a desired tolerance, only burn B (for MUB, FIG. 9) would be necessary. Once MUB was within tolerance, the wheel would be considered perfectly suitable for use. On the other hand, if all three types of unbalance exceed their tolerance, it is best to start with burn A so that both RUB and MUB can be corrected simultaneously. If the number of burns to correct MUB and RUB are different for this latter unbalanced flywheel, to use burn A some arbitrary choice must be made as to which parameter, MUB or RUB, will be corrected first. To illustrate, assume that RUB requires more burns than MUB. If one uses burn pattern A and fires the burns above or below the flexure plane to correct for MUB, by the time we have completed all of the burns necessary to completely correct RUB within tolerance, we will find that MUB has been over-corrected and that there is now a different MUB of opposite sign. Therefore, it is preferred in most cases that the lesser number of burns required for MUB or RUB be used for pattern A so that the parameter for which correction has not been completed is not overshot.

Referring now to FIGS. 10, 11, 12 and 13, a flow chart procedure is presented wherein the unbalances MOD, MUB and RUB in a flexure-suspended gyroscope such as that depicted in FIG. 4 can be determined and corrected by burning off selected portions of the outer rim of the flywheel. Throughout the entire procedure the flywheel is continuously rotating at a fixed speed. Much of the procedure in the flow chart is self-explanatory from the instructions given and a detailed explanation is not necessary in the text. The procedure includes a human operator who is given instructions by a cathode ray display or other suitable means in the test console 51. The human operator can, of course, be replaced by mechanical means where feasible, for example, for the step of orienting the gyroscope in a particular position. Throughout the procedure wherever the instruction is to input $D_x$ or $D_y$ values, the operator would sample pitch or roll restoring current and input the value to computer 13 to perform a computation of one of the unbalance parameters.

Figure 10:
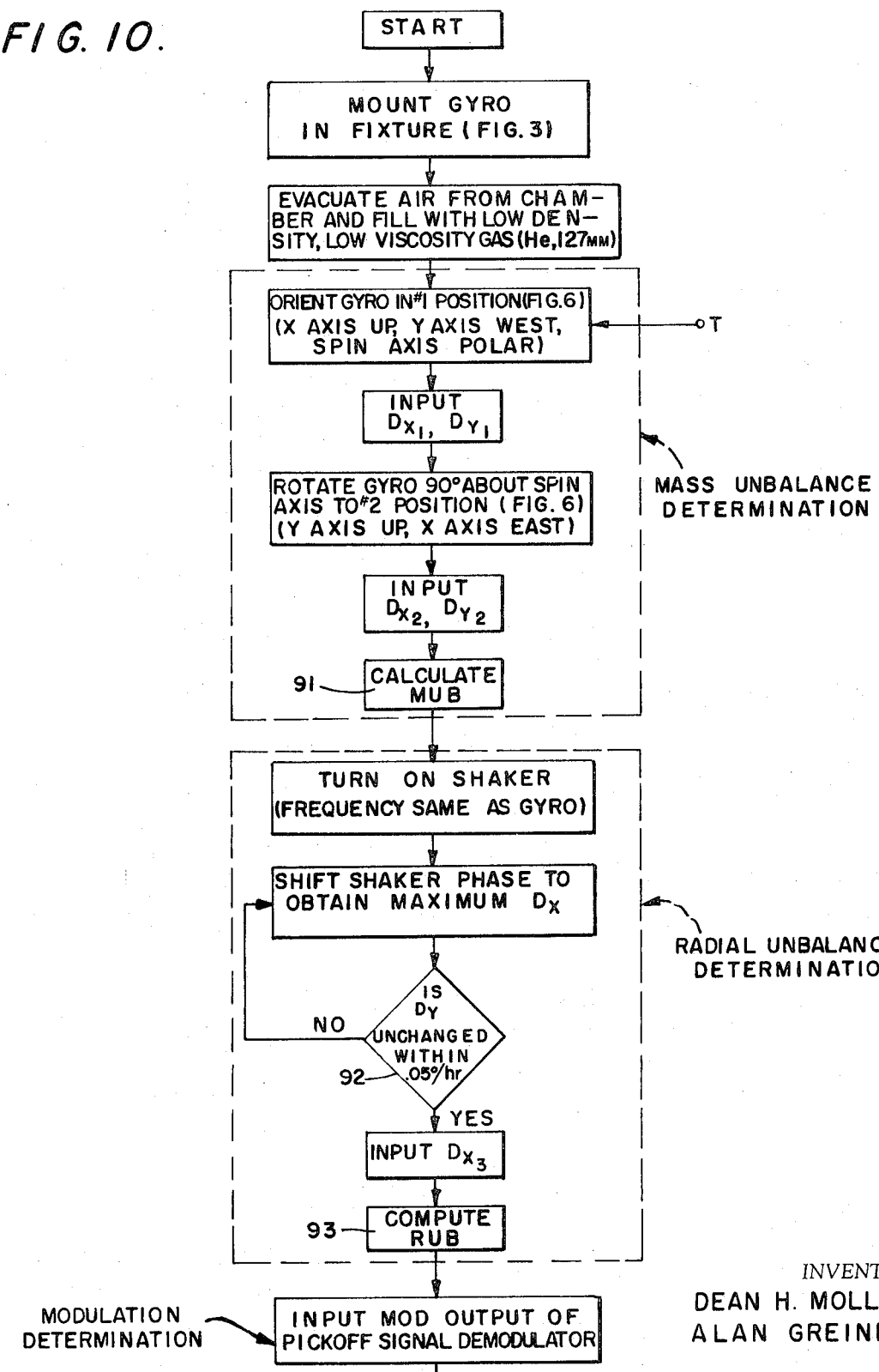
FIG. 10 is a flow chart illustrating a portion of the preferred test procedure.

FIG. 10 provides the portion of the procedure involving initial determination of the three parameters of unbalance. It should be noted that the mass unbalance determination is performed first with shaker 26 off. Instruction 91, "calculate MUB," is accomplished by computer 13 utilizing inputs $D_{x1}$, $D_{y1}$, $D_{x2}$ and $D_{y2}$, according to equation (2) above. After MUB has been computed, RUB is determined with the shaker table. Question 92 in the RUB determination insures that the heavy spot has in fact been shifted directly over one of the x axis pick-offs, since at this time there should be no pitch of the flywheel, that is, no drift on the y axis requiring a restoring torque. Instruction 93 "compute RUB" is accomplished by means of equation (1) above. Next, the magnitude of modulation with the shaker off is recorded.

Figure 11:
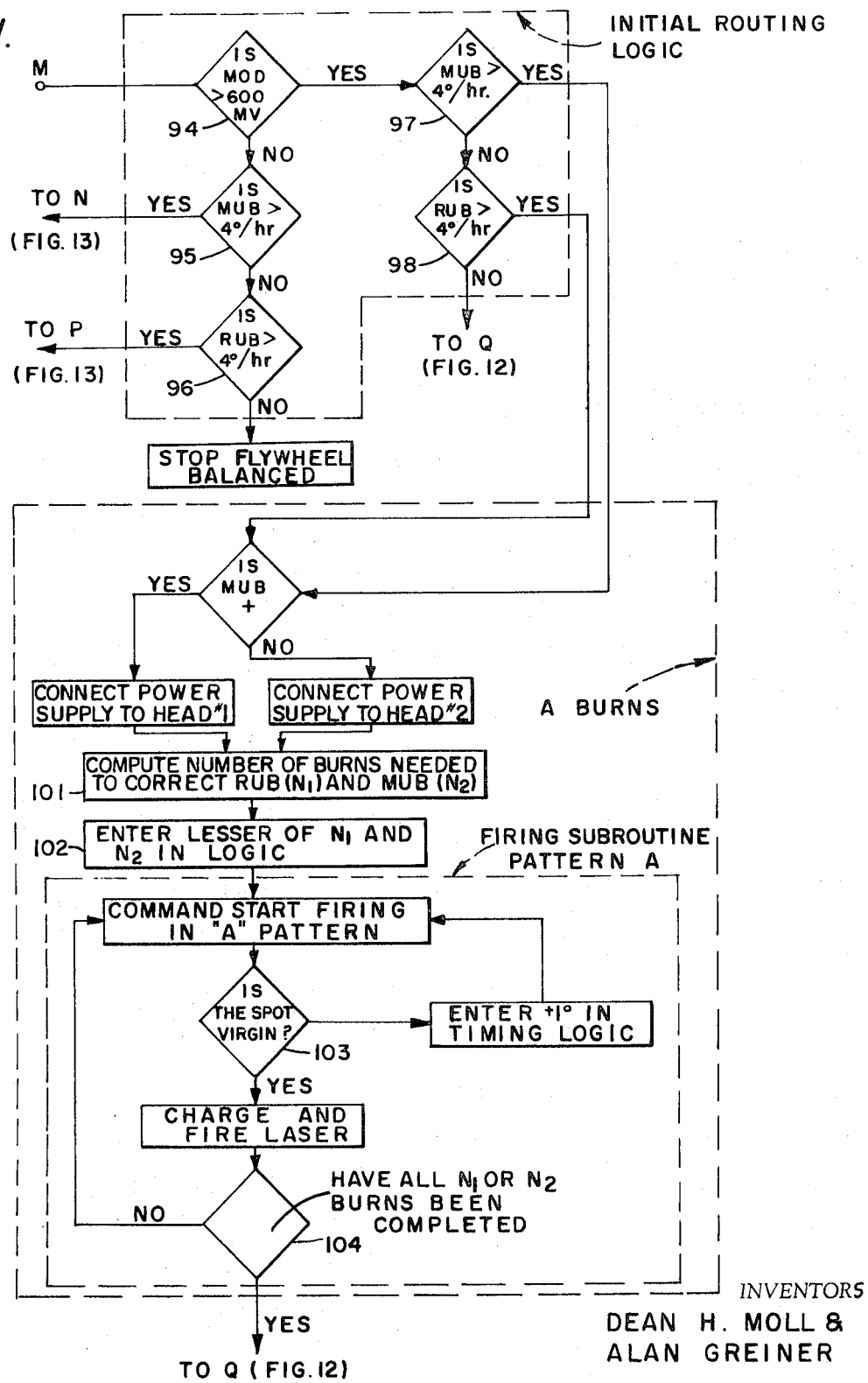
FIG. 11 is a flow chart illustrating a portion of the procedure including the initial routing logic and burn pattern A.

Once the initial unbalances have been measured, the procedure continues on FIG. 11, at "input" M to an initial routing logic question sequence. The purpose of the routing logic is primarily to determine which burn pattern, A, B, C or D (FIG. 9) should be used first. The initial routing logic also determines whether any short cuts can be made due to one or more of the unbalances being within the indicated tolerance. For example, if MOD is within tolerance the answer to question 94 would be "No." Assume now that the answer to question 95 (MUB) is also "No" and the only parameter out of tolerance is RUB so that the answer to question 96 is "Yes." At this point, much of the procedure which is normally followed can be by-passed since a RUB-only burn (pattern C) will suffice to completely balance the flywheel within acceptable limits. Similarly, if MOD alone is out of tolerance, the answers to questions 94, 97 and 98 will be "Yes," "No" and "No" respectively and the instruction will be given to execute a MOD-only type burn (pattern D). If the flywheel is already within acceptable limits, with respect to all parameters, the answers to questions 94, 95 and 96 will all be "No" and the balancing will be complete.

If excessive MOD exists along with MUB or RUB, or if all three parameters are simultaneously out of balance, the A burn program is initiated in FIG. 11. The appropriate head, number 1 or number 2 (corresponding respectively to lasers 11a and 11b, FIG. 2), aimed above or below the flexure plane is selected with reference to the polarity of MUB. Instruction 101 for computation of the number of burns requires a knowledge of the laser burn scale factor of the amount of change in a parameter such as MUB or RUB affected by a single burn. It is assumed, of course, that each time one of the laser burns is commanded, the same amount of mass is removed from the wheel. The RUB burns are computed as follows:

$$N_1 = INT\ [(RUB - 4°/\text{hr})/k_1],$$

where *INT* is an operator converting the value within the parantheses to the closest integer and $K_1$ is a scale factor representing the change in degrees per hour of RUB per single burn. Similarly, the number of MUB burns is computed as follows:

$$N_2 = INT\ [(MUB - 4°/\text{hr})/k_2],$$

where $K_2$ represents the MUB scale factor or the degrees per hour change in MUB for a single burn.

In instruction 102, timing logic unit 15 (FIG. 1) receives the lesser of $N_1$ and $N_2$ burns. The next set of instructions comprises a firing sub-routine in which the specified number of burns is carried out by computer 13 and timing unit 15. Firing in the A pattern of course requires that the appropriate angular position be selected for the single burns. This angular position is already known from the determination of RUB in which the phase of the shaker table is slewed so that the heavy spot was in a known location with respect to a given laser head. For each single burn, safety circuit 45 is either opened or closed by the answer to question 103 provided by pick-up 47 (FIG. 1). For example, if the number of burns entered into logic unit 15 is three and the first burn has already been accomplished and the second burn is being started at the same place, the spot will already have a crater. The laser will be disabled and the timing advanced 1° to avoid this spot on the next pass. Ordinarily the number of one degree increments will be few enough so that the radial mispositioning will be negligible. However, if a large number of one degree increments has been made in carrying out an equal number of burns, it may be desirable to provide a means for re-locating one or both of the heads at a different position along spin axis s; that is, raising or lowering the laser with respect to the flexure plane so that a new track of burns can be made at the same radial position. Question 104 as to whether the burns have been completed simply re-executes the burns one at a time until all of the burns required by the lesser of $N_1$ and $N_2$ have been completed.

Figure 12:
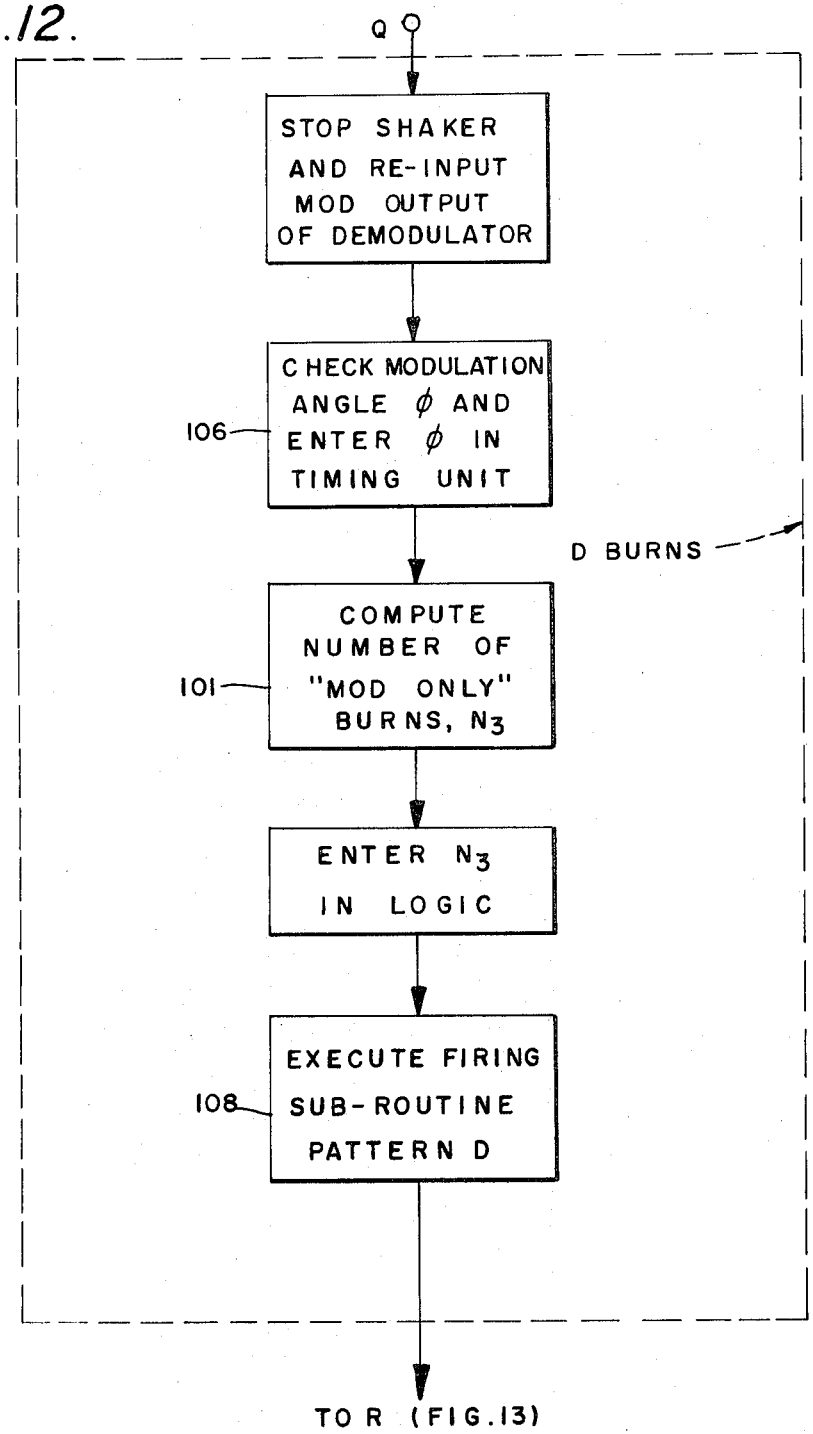
FIG. 12 is a flow chart illustrating another portion of the procedure including the burn pattern D.

If the A burn sequence of FIG. 11 has been completed, the procedure continues at input Q of FIG. 12 where the MOD or D burns are made. Of course, it should be recalled that the only reason the A burns were selected in the first place was that during the initial routing, MOD was out of tolerance. The A burns increase or decrease MOD; therefore, the initial step of the D burn sequence is to re-input the output of MOD demodulator 54. Instruction 106 requires the operator to determine the angle $\phi$ by means of the strobe light to correctly position the D burns about the spin axis. Instruction 107 (FIG. 12) is accomplished by means of the following equation:

$$N_3 = INT\ [(MOD - 600\ mv)/k_3],$$

where $k_3$ represents the MOD scale factor of the lasers or the change in millivolts of MOD affected by a single burn. Firing sub-routine pattern D, instruction 108, includes the same general procedure followed in the firing sub-routine for pattern A (FIG. 11). Therefore, the sub-steps are omitted in the drawing. Each time the timing logic senses the occurrence of the angle $\phi$, the two opposed 180° lasers are simultaneously fired.

Figure 13:
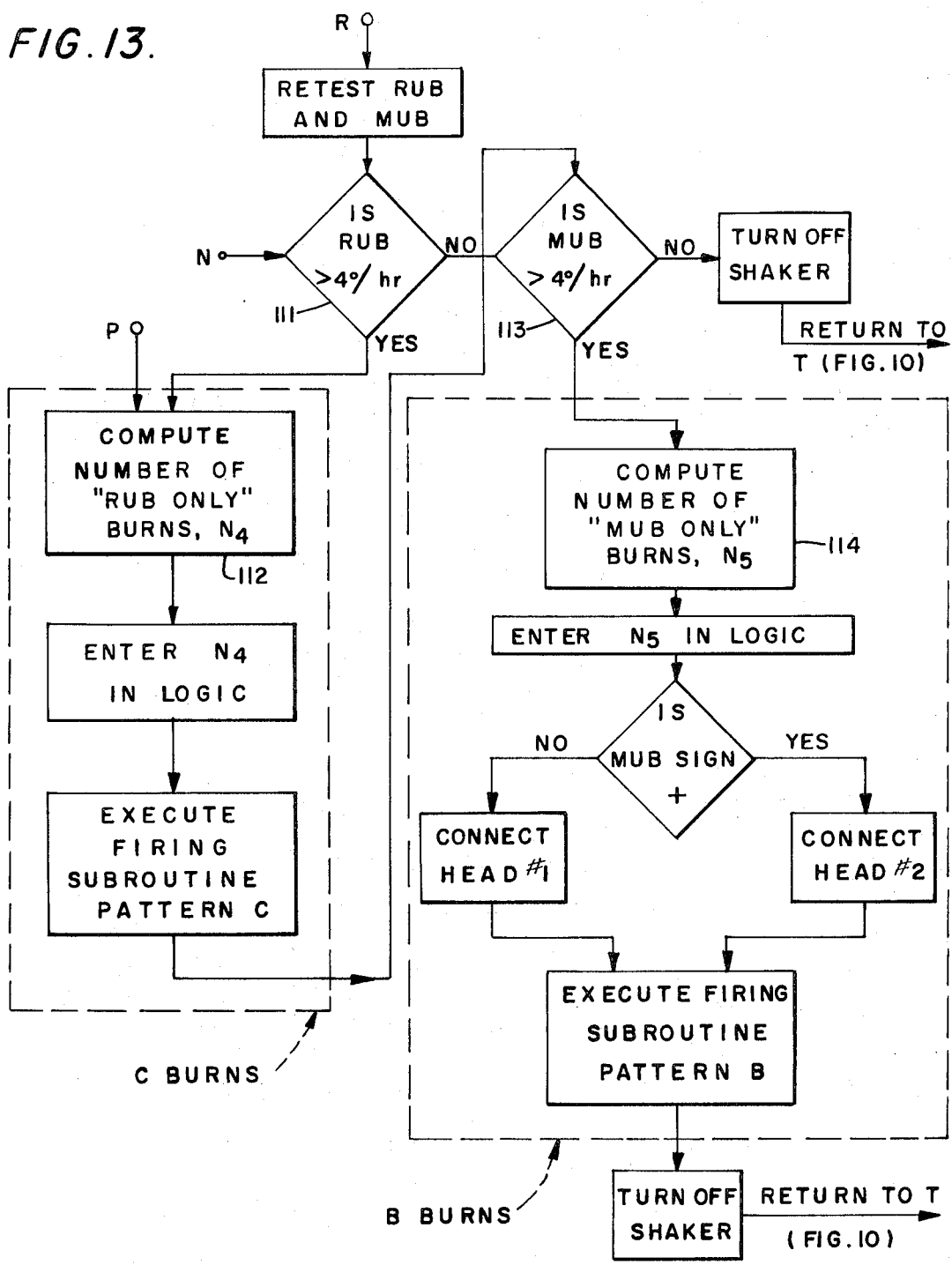
FIG. 13 is a flow chart illustrating another portion of the procedure including burn patterns B and C.

Following the D burns of FIG. 12, the procedure continues in FIG. 13 at input R where RUB and MUB are again tested as in the procedure of FIG. 10, starting and stopping the shaker table as required. If RUB remains out of balance, the answer to question 111 is "Yes" and the C burn pattern is executed. The number of RUB-only burns, $N_4$, required by instruction 112 is computed in the same manner as for the A pattern, except that the new value of RUB from the retest is used in the equation. Following the C burn pattern, if MUB is still out of balance, the answer for question 113 is affirmative and the B burn pattern or MUB-only pattern is executed. Again, the number of MUB-only burns required by instruction 114 is computed in the same manner as for the A pattern except that the new value of MUB from the retest is used. After the B burns are completed, the shaker is turned off and the operator is required to return to the MUB determination of FIG. 10 at input T for a final recheck of all the parameters. If the parameters retested in FIG. 10 are all within tolerance, the answers to questions 94, 95 and 96 in FIG. 11 will all be "No" and the operation will be complete.

Still referring to FIG. 11, two short cuts to N and P in FIG. 13 will be noted when MOD is within tolerance. The short cut to P from question 96 is made when the only parameter out of balance initially (or after retest) is RUB. The "Yes" answer to question 95 compels another question, 111, in FIG. 13 to determine whether the C burn pattern must first be executed. If the answer following question 95 to question 111 is "No," then the only existing unbalance parameter is MUB. Therefore, only the B burn or MUB-only pattern would be required.

The flow chart procedure in FIGS. 10 through 13 is presented merely as an illustration of one manner in which the tests and burns can be implemented. Those skilled in the art will recognize that further redundant loops and cross-checks can be built into the system as required. The degree of balance is controlled by changing the tolerance limits for the unbalance parameters. A similar flow chart procedure is used in carrying out the three laser burn system of FIG. 8. It should be noted that the scale factor of laser burns for MUB and MOD can be adjusted by changing the relative distance of the spot at which a given laser is aimed from the flexure plane.

The advantages of the invention are numerous. First of all, all of the unbalance test and correction equipment is provided in a single integrated system in which the gyroscope is continuously rotating throughout the entire operation. Because of the arrangement of the apparatus, therefore, the time required for complete balance is drastically reduced. By using a fixed procedure employing a minimized number of laser burns and a set of burn patterns requiring only two laser heads in a fixed location, much of the trial and error guesswork of the balancing operation can be eliminated by appropriate programming of a general or special purpose computer to calculate unbalances and numbers of burns, and to make command decisions based on certain logical, predetermined combinations of excessive unbalances. Another advantage is using a low viscosity, low density atmosphere for more accurate testing. The use of a pressurized stream and a styrofoam wall for collecting molten material burned off of the flywheel makes the use of low density, low viscosity gas feasible. Without such a system of material collection, the flywheel would become contaminated unless it were in the open air. It should be noted that the stream can be eliminated if the angle of the natural plume is such that it strikes the wall. The photocell safety system within the test chamber provides a simple and fool-proof method of protecting the flywheel from stacked burns without requiring time-consuming visual inspection or complicated memory of burn positions by an electronic storage unit. In addition, the methods for determining MUB and RUB have also been improved and simplified.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. Apparatus to measure and correct unbalance in a test mass comprising:
   a. means to rotate the test mass;
   b. shaker means to provide reciprocating motion when activated;
   c. support means operatively mounted on said shaker means from movement therewith holding said test mass and said means to rotate said test mass;
   d. at least one beamed energy source rigidly mounted on said support means and aimed for its beam axis to intersect said test mass, said beamed energy means having a beam of sufficient power to burn off a portion of said test mass when activated;

e. a shaker power supply synchronized with said means to rotate;

f. a phase shifter coupling said power supply to said shaker, said phase shifter operable to selectively shift the phase of the signal from said shaker power supply to said shaker in response to a control input;

g. means adjustable to provide said control input;

h. a power supply for activating said beamed energy means, said power supply being responsive to a triggering input;

i. computing means providing a first output for a predetermined time to activate said shaker power supply, during which time said adjustable means may be adjusted to cause a phase shift which will result in the heaviest portion of said mass being positioned to intersect the axis of the laser beam in synchronism with a stroke of the shaker and thereafter to provide a second output in response to the setting of said adjusting means said second output being said triggering input to trigger said laser power supply, whereby said laser beam will burn off a portion of said test mass at its heaviest portion.

2. The apparatus of claim 1 wherein said support means includes a platform on which said beamed energy means is mounted having means for holding the rotating test mass and a rotatable mount operatively connected between said platform and said shaker means for rigidly positioning said platform in a predetermined angular orientation.

3. The apparatus of claim 2 further comprising a sealable cover rigidly mounted on said platform enclosing and forming a test chamber for the test mass and having a window located such that said beamed energy means can be operatively aimed at the test mass therethrough and having a suitable port for introducing a gas into said chamber.

4. The apparatus of claim 3 further comprising means for providing a low density, low viscosity gas within said chamber.

5. The apparatus of claim 3 further comprising a safety system operatively disposed within said chamber secured to said platform and means coupled to said safety system for preventing said beam energy means from being fired at point on a test mass which has already received a burn.

6. The apparatus of claim 5 wherein said safety system includes a thin beam light source mounted within said chamber and aimed to reflect a beam of light off a point on the test mass corresponding to the position at which said beamed energy means is aimed, and a photo-sensitive element operatively mounted in said chamber to receive the reflected light for providing a signal to said said means to prevent firing indicative of the presence of a burn.

7. The apparatus of claim 3 further comprising means mounted in said chamber for preventing contamination of the test mass by material removed by a burn.

8. The apparatus of claim 7 wherein said contamination-preventing means includes a wall having an irregular surface which is meltable by contact with the removed material disposed adjacent to the test mass.

9. The apparatus of claim 8 wherein said contamination-preventing means further includes jet means for directing a pressurized stream of gas at the point at which said beamed energy means is aimed to direct the material removed by a burn toward said wall.

10. The apparatus of claim 9 wherein the surface of said wall is made of styrofoam.

11. In balancing apparatus for a rotating test mass wherein a test mass and a means to rotate the test mass are mounted upon a support means along with a laser, and including means for directing a beam from said laser when fired, along an axis to intersect a portion of said test mass, means for firing said laser in response to a test mass unbalance for burning off a portion of said test mass, and means for preventing burning of said test mass at the same spot more than once, said means for preventing burning, comprising;

a. a thin beam light source mounted to said support means and aimed at the intersection of the laser beam axis with the test mass;

b. a photosensitive means mounted to said support means and disposed to intersect the reflected beam of said thin beam source to provide an output at a first level when said beam intersects a smooth unburned area on said mass and at a second level when said beam intersects a burned portion on said mass; and c. means responsive to the output of said photosensitive means at said second level to prevent said laser from firing.

12. The invention according to claim 11 wherein said means to prevent firing comprises to means to interrupt the power supplied to the laser by the laser power supply.

13. In an apparatus wherein a rotary test mass and means to rotate the test mass are mounted on a support means along with a laser, and including means to direct a beam from said laser along an axis to intersect said test mass to burn off a portion of material, and means to collect the material burned off by the laser, said means for collecting, comprising:

a. gas jet means mounted to said support means on one side of said test mass to direct a blast of gas at the intersection of the laser beam axis with the test mass substantially perpendicular to said axis to blow away material burned off by said laser beam; and b. collection means mounted to said support means on the other side of said test mass substantially perpendicular to and intersecting with the material blown away by the blast from said jet, said collection means comprising a material having an irregular surface which will melt at the temperature of said burned material and entrap said burned material will be blown to said collection means and trapped therein.

14. The apparatus of claim 13 wherein said collection means is made of styrofoam.

* * * * *